United States Patent
Yard

[15] 3,638,579
[45] Feb. 1, 1972

[54] CONVERTIBLE RAIL-HIGHWAY SHUNTING LOCOMOTIVE

[72] Inventor: William James Yard, Cavan, Australia
[73] Assignee: Aresco Trak-Chief Proprietary Limited, Cavan, Australia
[22] Filed: Nov. 12, 1969
[21] Appl. No.: 875,758

[52] U.S. Cl. ............................105/26 R, 105/26.1, 105/75, 105/90 A, 105/215 C, 213/75
[51] Int. Cl. ...................B61c 13/00, B61d 15/00, B61f 9/00
[58] Field of Search ...............105/26 R, 73, 75, 90 A, 215 C, 105/26.1; 213/75

[56] References Cited

UNITED STATES PATENTS

| | | | |
|---|---|---|---|
| 3,380,397 | 4/1968 | Yard | 105/26 R |
| 3,420,191 | 1/1969 | White, Jr. | 105/26 R |

*Primary Examiner*—Arthur L. La Point
*Assistant Examiner*—Howard Beltran
*Attorney*—Oldham & Oldham

[57] ABSTRACT

A shunting vehicle for positioning trucks on a railway line wherein the coupling is rotatable, not about a central pin as an axis but by movement guided by angled slots to thereby throw the center of rotation forwardly and avoid displacement of the shunting vehicle wheels from the rails.

5 Claims, 4 Drawing Figures

CONVERTIBLE RAIL-HIGHWAY SHUNTING LOCOMOTIVE

This invention relates to a shunting vehicle of type similar to the shunting vehicle disclosed in the Australian Pat. No. 261,863.

In the U.S. Pat. No. 3,380,397, a shunting vehicle was disclosed and claimed wherein a vehicle included a chassis, traction wheels at least partly supporting the chassis, the track width of the wheels enabling them to run on the rails of the railway track, a coupling block at one end of the vehicle adjacent the traction wheels engageable with a complementary coupling on a railway vehicle, and lifting wheels operable to apply a lifting force to the coupling block relative to the chassis. This enables part of the weight of the railway vehicle coupled to the shunting vehicle to be transferred to the traction wheels thereof, so that considerable traction could be obtained even though the wheels ran on the rails.

The usual coupling block, which is described in the U.S. Pat. No. 3,380,397, is provided with a hinge pin, but this is not sufficient to prevent a railway truck from pushing the traction wheels of a shunting vehicle off the rails, if the truck happens to be negotiating a relatively sharp bend. Accordingly the U.S. Pat. No. 3,380,397 disclosed a coupling subchassis rotatable on the main chassis of the vehicle, the rotation means being constituted by a simple turntable.

One of the problems however, which is encountered with a simple turntable for the subchassis carrying the coupling block, is that the tremendous traction force involved will tend to jam the relatively rotatable parts of the turntable and chassis, and this frictional engagement can be sufficient to urge the traction wheels of the shunting vehicle away from the rails so that traction can be lost, and further, so that excessive thrust loads are placed on the bearings of rail guide wheels when these are used.

The main object of this invention is to provide improvements whereby the tendency for lateral displacement of the traction wheels is substantially reduced, and the invention includes as a feature complementary substantially flat members on the chassis of a shunting vehicle and on a coupling subchassis, pin means extending between the complementary members, a bearing plate surrounding each pin means, and corresponding slots in the other of the members, the slots being angled relative to the direction of towing force.

By having this arrangement it becomes possible to avoid the use of a pin for a turntable, and the loading is directly transferred through the bearing plate to the member engaged thereby, and the effective center of rotation can be transferred thus further forwardly and closer to the center of the vehicle than with a rotary table.

An embodiment of the invention is described hereunder in some detail with reference to and is illustrated in the accompanying drawings in which.

Figure 3:
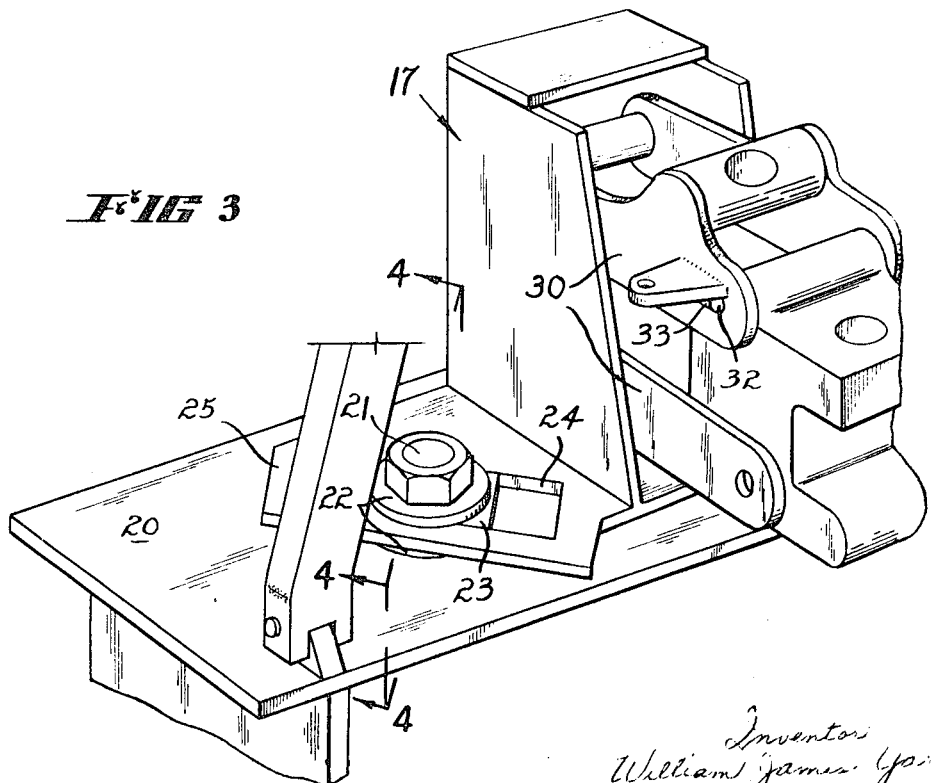
FIG. 3 is a fragmentary perspective view of same.
Figure 4:
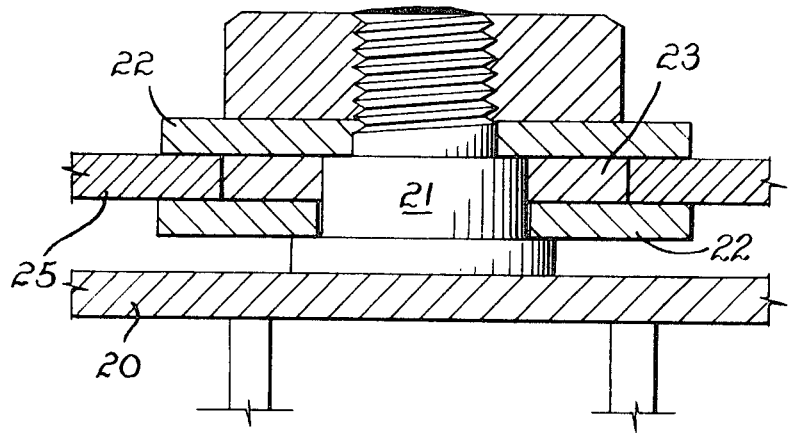
FIG. 4 is a section on plane 4—4—4 of FIG. 3.

According to this embodiment a shunting vehicle 10 is constructed substantially similar to the vehicle of the U.S. Pat. No. 3,380,397, being provided with a chassis 11, a pair of rubber-tired traction wheels 12, a pair of guide wheels 13 carried on retractable arms and adjacent the rubber-tired traction wheels, a pair of steered wheels 14 which in this embodiment will be referred to as the front wheels, front guide wheels 15 also carried on retractable arms and adjacent the steered wheels, a turntable 16 beneath the chassis, a coupling subchassis 17, and a coupling 18 (not shown in FIG. 3). The guide wheels and turntable are respectively arranged to be raised or lowered thereby enabling the vehicle to be moved transversely across a railroad track on its wheels 12 and 14, the turntable 16 then being lowered to lift the wheels 12 and 14, the shunting vehicle then being rotated centrally over the railroad track, the wheels 12 and 14 being supported by the railroad track, and the guide wheels being lowered to engage the railroad track.

Figure 1:
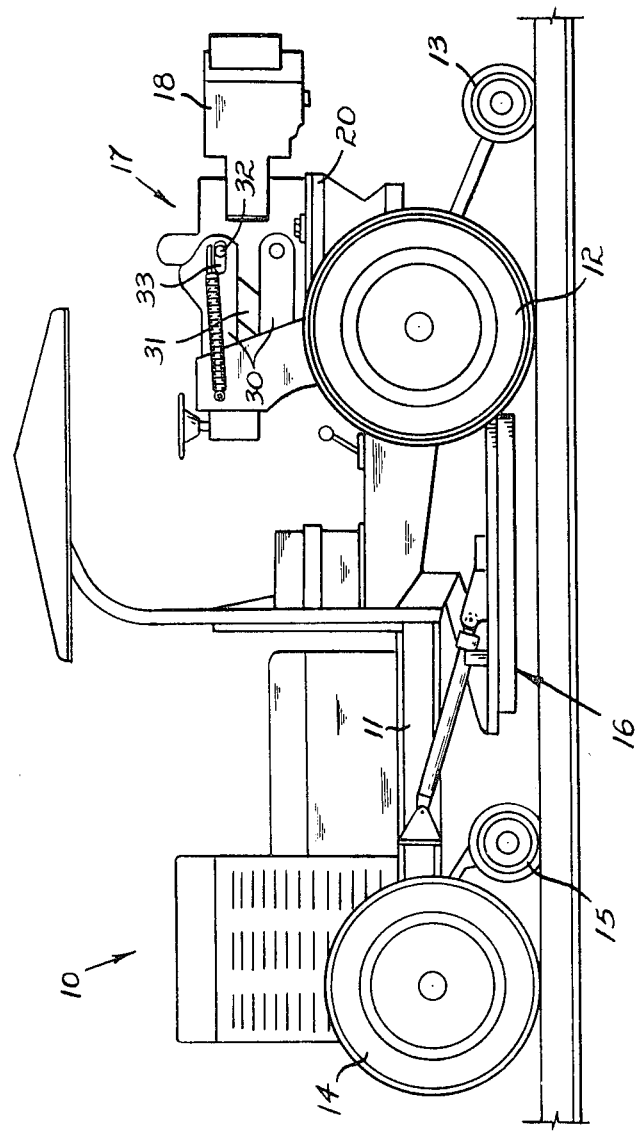
FIG. 1 is a side elevation of a shunting vehicle.

The chassis 11 is provided with a flat chassis plate 20 extending transversely and this in turn is provided with a pair of spaced upstanding pins 21, these pins supporting upper and lower retention discs 22 in each case and retained by nuts, and a bearing plate 23 rotatable on each pin 21, the bearing plate having side surfaces which are disposed in slots 24 and engageable against the sides thereof, the slots 24 being in side wings 25 on the coupling subchassis 17. The coupling subchassis 17 is provided with a pair of swivel arms 30 which are arranged to raise and lower the coupling block 18 in pantograph fashion, driven by a ram 31 (not shown in FIG. 3). The upper swivel arm engages the coupling subchassis by pin means 32 engaging in a substantially horizontal slot 33 (FIG. 1) to allow relative pitching between the towed vehicle and the shunting vehicle.

Figure 2:
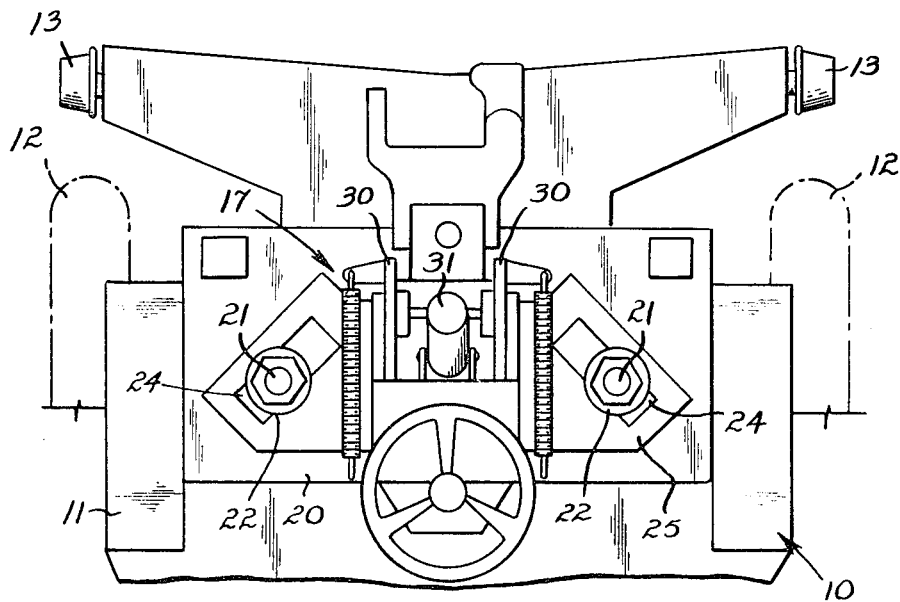
FIG. 2 is a fragmentary plan (to an enlarged scale) showing the coupling subchassis.

Since the slots 24 can throw the effective center of rotation of the coupling subchassis forwardly as can be seen by studying FIG. 2, the effective moment tending to displace the traction wheels laterally is greatly reduced than when a simple turntable is used. This has the effect of greatly reducing the tendency to displace the vehicle from the rails.

I claim:

1. A shunting vehicle having a chassis supported on rail-engaging rubber-tired wheels, retractable arms on the chassis, flanged rail-engaging wheels carried by the retractable arms and engaging the rails thereby retaining said rubber-tired wheels on the rails, said chassis having a front end and a rear end, and a coupling subchassis on the chassis at its rear end, and comprising the improvement of a flat horizontal member on the chassis movably supporting a complementary flat horizontal member on the subchassis, a pair of slots in one of the members, a corresponding pair of pins in the other member passing through the slots, and bearing plates pivotally supported by the pins and slidably engaging the edges defining the slots, the slots being positioned symmetrically with respect to the longitudinal centerline which extends between the front and rear ends of said member which contains them and diverging away from each other in the direction of the front of the chassis so that when rotation of the subchassis with respect to the chassis takes place under operating conditions, said bearing plates slide within said slots and the effective center of rotation of the subchassis is transferred forwardly of the slots.

2. A shunting vehicle according to claim 1, further comprising a coupling on the coupling subchassis, the coupling being supported by an upper pair of arms and a lower pair of arms, pivot means between respective rear ends of the arms and the coupling, and further pivot means between respective front ends of the arms and the subchassis.

3. A shunting vehicle according to claim 2, further comprising a lifting ram arranged to lift the coupling relative to the subchassis, the lifting ram extending between the upper pair of arms and the subchassis.

4. A shunting vehicle according to claim 1, wherein the pins are welded to the flat horizontal member on the chassis and extend upwardly through the slots, said slots being in the flat horizontal member on the subchassis, the bearing plates are carried between upper and lower retention discs on the pins, and nuts on the pins retain the retention discs and bearing plates in respective assemblies.

5. A shunting vehicle according to claim 2 wherein said pivot means between the coupling and the two pairs of arms include a substantially horizontal slot to permit relative pitching between the towed vehicle and the shunting vehicle.

* * * * *